June 11, 1940.   D. H. GLEASON   2,204,181
CALL TRANSMITTER
Filed Sept. 15, 1938

INVENTOR
D. H. GLEASON
BY J. MacDonald
ATTORNEY

Patented June 11, 1940

2,204,181

UNITED STATES PATENT OFFICE 2,204,181

CALL TRANSMITTER

Daniel H. Gleason, Mountain Lakes, N. J., assignor to Bell Telephone Laboratories, Incorporated, New York, N. Y., a corporation of New York Application September 15, 1938, Serial No. 230,006

3 Claims. (Cl. 179—90)

This invention relates to telephone call transmitters.

It is an improvement over the impulse transmitter disclosed in Patent 1,390,679, granted to H. F. Dobbin and E. W. Gent, September 13, 1921.

In this patent a wheel is provided with a number of finger holds for turning it from its normal position an angular distance corresponding to a digit selected from a stationary plate having numbers printed in registry with the finger wheel holes. The selective turning movement of the finger wheel toward a finger stop member is effective to tension a motor spring, the function of which is to return this wheel to normal and actuate a pulsing mechanism in which a ten-tooth cam carried by the finger wheel supporting shaft in turn actuates a pivoted pawl provided for opening normally closed pulsing springs a number of times corresponding to the digit selected, the movement of the pawl during the selective movement of the finger wheel being in a direction away from and ineffective to cause the operation of the pulsing springs, while a retractile spring is provided for returning the pawl to normal position following its successive operation by the teeth of the cam either during the selective movement of the finger wheel or the pulsing cycle of the transmitter.

In the operation of this impulse transmitter, it was found that during each return pivotal movement of the pawl under the tension of its retractile spring, this pawl due to its momentum, as imparted to it by its retractile spring, passed beyond its normal radial position relative to the center of the cam and came successively into contact with the sides of the teeth of the rotating cam. These elements striking each other while in motion in directions opposite to each other created considerable noise, especially during the selective turning movement of the finger wheel, which is generally effected by the operator at a relatively great rate of speed.

The object of the invention is to provide a damping mechanism for quieting the operation of the pulsing spring actuating pawl, whereby the noise generated by the coming of the pawl into contact with the teeth of the cam is reduced.

Figure 1:
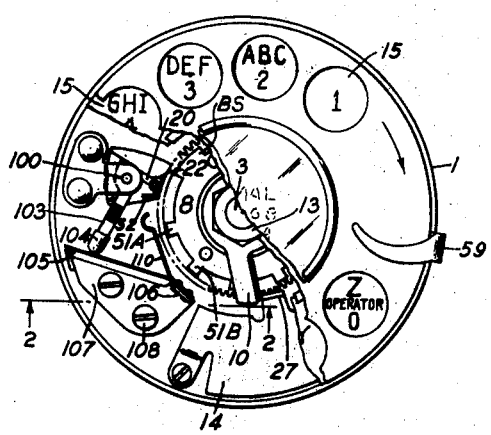
Fig. 1 is a front view of an impulse transmitter shown with the pawl's damping mechanism of the invention embodied therein, a number of operating parts of the transmitter being shown with portions cut away and the pulsing spring actuating pawl in normal unoperated position.

More specifically, in the impulse transmitter in which the present invention is adapted for use, a finger wheel 12 is securely mounted on a shaft 3 by a nut 13. The shaft 3 is rotatably mounted in a bushing 2 in the center of a cup-shaped casing 1 and on this shaft is mounted a cam 8, a gear 7 and an arm 10 which normally abuts against a stop lug 27 under the normal tension of a motor spring 5 having one of its ends hooked to the casing 1 and its other end to the shaft 3, whereby a rotary movement of the finger wheel from one of the digits appearing on a number plate 15 to the finger stop 59 is effective to tension this motor spring, the function of which is to return the finger wheel 12 and the cam 8 to normal unoperated position when the arm 10 engages the stop 27, the return movement of cam 8 under control of a speed governor (not shown) actuated by the gear 7 being effective to engage a pawl 20 for opening normally closed impulse springs as will be hereinafter described in detail.

Figure 2:
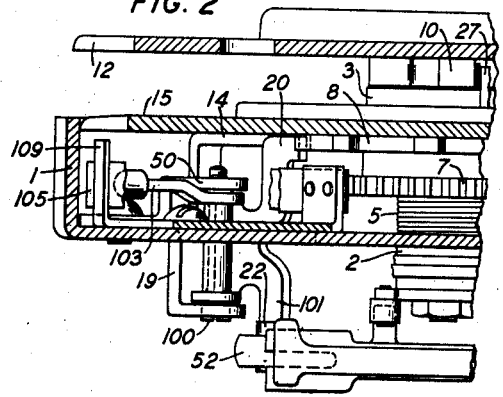
Fig. 2 is a partial view of the transmitter shown in cross-section taken on line 2—2 of Fig. 1.

Casing 1 is formed with a lug portion 19 which cooperates with a bracket 50 for pivotally mounting the pawl 20, as on a screw 100. Pawl 20 extends radially relative to the center of cam 8 in engageable relation with the teeth 51 thereof. The pawl 20 is formed with an arm 101 shown in Fig. 2 provided at its free end with a sleeve or roller 22 of insulating material disposed in engageable relation with an operable contact spring 52 for actuating it and thereby opening the contact CO upon the return movement of cam 8 to normal under the tension of the motor spring 5 following each selecting movement of the finger wheel 12. The pawl 20 according to the present invention is formed with an arm 103 extending at right angles thereto and is provided at its free end with a bushing 104 of good friction material disposed in engageable relation with a flat spring 105 tangentially disposed to the arc generated by the free end of arm 103 and having one of its ends riveted to an upright extending lug 106 of a bracket 107 which is in turn secured to the casing 1 by screws 108, the free end of spring 105 being supported by a lug 109 also formed with a bracket 107 so as to cause this spring to slightly flex upon the passing of arm 103 on each side of its dead center; that is, upon each reverting movement of finger wheel 12 as will be hereinafter described in detail.

Figure 3:
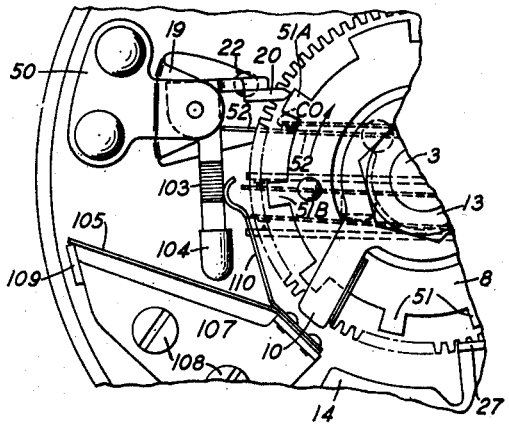
Fig. 3 is a partial view of the transmitter shown with the spring actuating pawl in its maximum actuated position during the selective movement of the transmitter.

On the lug 106 of bracket 107 and in superposed relation to spring 105 there is securely mounted a spring arm 110 positioned as to be tensioned when the arm 103 is moved from the position shown in Fig. 1 to the position shown in Fig. 3 during the operation of the finger wheel in the direction indicated by the arrows so as to return this pawl when released by the teeth of cam 8 to reengage each of the succeeding teeth 51 in addition to limiting the angular movement of this pawl due to the momentum imparted to it by the rotation of the cam during the relatively fast selecting movement of the finger wheel.

In the operation of this impulse transmitter, with the finger wheel 12 in normal non-operated position, the stop arm 10 abuts against the stop lug 27 of supporting plate 14 and the pawl 20 clearing the side of a blank space of cam 8 as shown in Fig. 1, while the insulating sleeve 22 at the end of arm 101 of pawl 20 is a small distance away from the operable pulsing spring 52 as to assure the closure of contact CO, the arm 103 of pawl 20 being to the left of its dead center with a small clearance between the damping spring 105 and the friction bushing 104 carried by this arm. Upon the rotating movement of the finger wheel 12 in the direction indicated by the arrow, shown in Fig. 1, for example, an angular distance determined by the location of the digit $$\left(\frac{ABC}{2}\right)$$

on the number plate 15 and the finger stop 59, the movement of cam 8 in its clockwise direction through the engagement of its front tooth 51A with the pawl 20 causes the pivotal movement of this pawl from the left to the right of its dead center, thereby flexing the spring 105. Upon the angular movement of pawl 20 a small distance after passing its dead center, the arm 103 of this pawl engages the spring 110 to flex it until the end of pawl 20 rides on the arc or ineffective portion of tooth 51A, this condition being shown in Fig. 3. Upon the continued selective operation of the finger wheel to a point where the tooth 51A releases the pawl 20, this pawl is returned to normal by the tension of spring 110, but is prevented from passing beyond its radial position relative to the center of cam 8 through the frictional engagement of bushing 104 at the end of arm 103 with the damping spring 105 with the result that the return movement of the pawl under the tension of spring 110 while being effected at a considerable speed, does not come into contact with the side of the second tooth 51B of cam 8 or any of the consecutive teeth following each return movement of the pawl and this condition has been found to effectively avoid the noise heretofore caused by the pawl and the teeth of cam 8 when coming into contact during their movement in opposite direction to each other as during the selective operation of the transmitter.

Figure 4:
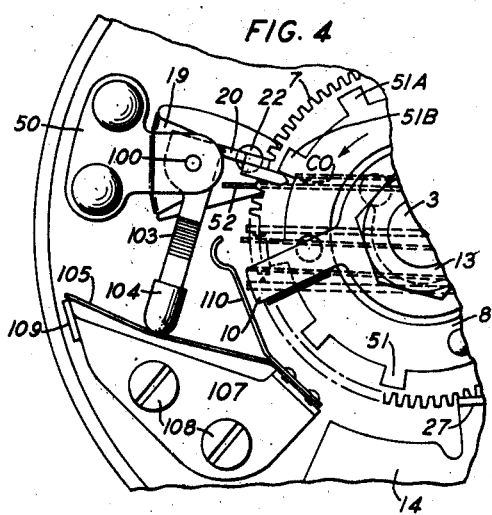
Fig. 4 is a view similar to that of Fig. 3 shown with the impulse spring actuating pawl in engaged relation with the cam during the pulsing or return movement of the cam to normal.
Figure 5:
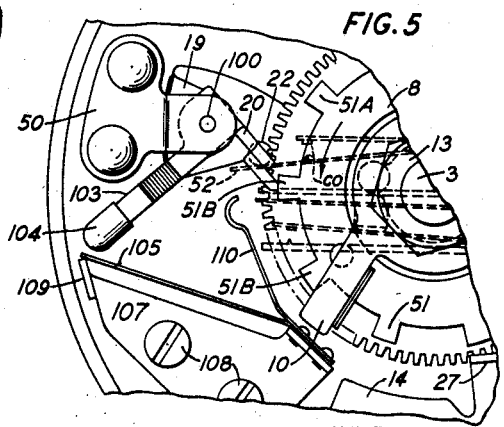
Fig. 5 is a partial view of the transmitter showing the pulsing contact actuating pawl in its maximum operated position during the pulsing or return cycle of the cam toward normal position.

Similarly, upon the return movement of finger wheel 12 under the tension of the motor spring 5, the operation of pawl 20 due to its engagement now with the opposite side of tooth 51B, is forced to pass to the left of its dead center causing the insulating roller 22 carried by arms 101 of this pawl to engage the operable pulsing spring 52 for opening the contact CO, this condition being shown in Fig. 5. The continued rotation of cam 8 in the direction indicated by the arrow shown in Figs. 4 and 5 to a point wherein the tooth 51B releases the pawl 20, this pawl is returned to normal under the tension of pulsing spring 52, but is as in the first example prevented from passing beyond its dead center due to the arm 103 engaging and tending to flex the damping spring 105 so that pawl 20 and the side of the tooth 51A of the cam 8 or any of the consecutive teeth, following each return movement of the pawl, do not come into contact and the noise which would be due to such contact is effectively eliminated resulting in the provision of an impulse transmitter, in which the noise is reduced to a minimum level.

What is claimed is:

1. A call transmitter having a supporting shaft, a manually operable element secured to the shaft, a multiple cam rotated by the movement of the shaft, and a set of pulsing contacts, in combination with a pawl disposed for operation by the movement of the cam for actuating the impulse contacts, an arm carried by said pawl, and resilient means engaged by said arm for damping the operation of said pawl when actuated by the multiple cam.

2. A call transmitter having a casing, a rotatable shaft, a finger wheel and a cam carried by the rotatable shaft and pulsing contacts secured to the casing, in combination with a pawl engaged by the cam upon the rotation of the latter for actuating the pulsing contacts, an arm carried by said pawl having a bushing of friction material mounted at its free end, a bracket secured in the casing having a pair of parallel disposed arms, a spring member secured to one end of one of said arms and its free end abutting against the end of the other of said arms, said spring being disposed tangent to a radius of a length slightly less than the arc generated by said bushing to cause said spring to flex for damping the movement of said pawl following its successive engagement and release by said cam.

3. A call transmitter having a casing, a bearing and normally closed pulsing contacts mounted on the casing, a shaft rotatably mounted in the bearing, a multiple camming wheel securely mounted on the shaft, and a finger wheel for rotating the shaft, in combination with a pawl pivotally mounted in the casing in engageable relation with the camming wheel for actuating the contacts, an arm carried by said pawl, a bushing of friction material carried by said arm, a bracket securely mounted in the casing, a spring secured to said bracket tangentially to the arc generated by the extreme end of said bushing but at a point to be flexed by said bushing upon the movement of said pawl for damping the operation thereof, a retractile spring secured to said bracket and extending in engageable relation with said arm for returning said pawl in engageable relation with the camming wheel following its operation by the movement of the latter during the manual operation of the finger wheel.

DANIEL H. GLEASON.